United States Patent
Ghosh et al.

[11] Patent Number: 5,520,601
[45] Date of Patent: May 28, 1996

[54] CERAMIC ROLLERS FOR CONVEYANCE OF PHOTOGRAPHIC FILMS AND PAPER POLYMERIC WEBS

[75] Inventors: Syamal K. Ghosh; Dilip K. Chatterjee; Theodore R. Kolb, all of Rochester, N.Y.

[73] Assignee: Eastman Kodak Company, Rochester, N.Y.

[21] Appl. No.: 403,082

[22] Filed: Mar. 13, 1995

[51] Int. Cl.⁶ .................................................. B23P 15/00
[52] U.S. Cl. .................................................. 492/58
[58] Field of Search .................. 492/58; 428/34.4, 428/34.6; 501/105, 152

[56] References Cited

U.S. PATENT DOCUMENTS 5,290,332  3/1994  Chatterjee et al. ............... 65/18.1
5,336,282  8/1994  Ghosh et al. ...................... 51/309
5,358,913  10/1994 Chatterjee et al. ................ 501/103

FOREIGN PATENT DOCUMENTS 4017625  1/1992  Japan.

*Primary Examiner*—Irene Cuda
*Attorney, Agent, or Firm*—Carl F. Ruoff

[57] ABSTRACT

A ceramic conveyance roller having a tetragonal phase crystal grain structure includes zirconium oxide and yttria and the molar ratio of yttria to zirconium oxide of from about 3:97 to about 5:95. The outer surface of the ceramic roller has a dimensional tolerance of less than 0.003 inches and the inner surface has a dimensional tolerance of less than 0.0005 inches. The outer surface of the roller can be modified to the cubic phase crystal grain or the monoclinic phase crystal grain.

9 Claims, 1 Drawing Sheet

CERAMIC ROLLERS FOR CONVEYANCE OF PHOTOGRAPHIC FILMS AND PAPER POLYMERIC WEBS

FIELD OF THE INVENTION

The present invention relates to ceramic rollers for transportation of photographic films and paper and polymeric webs into and out of a perforating or slitting/packaging machines. More particularly, the present invention relates to the net shape manufacturing of ceramic rollers.

BACKGROUND OF THE INVENTION

Precision rectangular perforation on photographic film edges is required to advance or rewind films in cameras or projection of movie films on the screen. During perforation of the photographic film, the photographic film rides over the outer surface of a series of rollers. This necessitates a hard and wear resistant outer surface for the rollers. The rollers are typically chrome plated stainless steel. The outer surface finish is very critical in that rollers should not scratch the photographic films. Thin chrome plating generally provides an adequate hard wear resistant surface which does not produce scratches on the photographic film. Thick chrome plating, however, generates a rough surface and is not used for rollers transporting photographic film. In addition, the rollers in the perforator rotate on a hardened steel pin. Typical inside diameters of the rollers are 60 to 70 thousandths of an inch. The small inner diameters of rollers are too narrow to provide a uniform chrome plating and that in turn limits the service life of conveyance rollers.

Moreover, photographic film contains corrosive silver halide salts which attack stainless steel through microcracks and pores in the chrome plating. The corrosion products along with the wear debris tend to contaminate the films and also accumulate between the pin and the inner surface of the roller, thus, reducing clearance and jamming the transportation process. Wear of the pin and roller causes excessive runout and the perforating machines need to be stopped and overhauled frequently.

The present invention replaces the chrome plated stainless steel rollers with yttria-tetragonal zirconia polycrystal (Y-TZP) ceramic which rotate on hardened steel pins. Superior wear and corrosion resistance of the Y-TZP ceramic make these rollers more productive than chrome plated steel rollers. In addition, the absence of corrosion products and the lessening of steel pin wear reduces debris and helps reduce film contamination and prolongs the service life of the perforating machine.

SUMMARY OF THE INVENTION

The present invention is a ceramic roller which has an outer surface and an inner surface. The ceramic roller consists essentially of zirconium oxide and yttria in a molar ratio of yttria to zirconium oxide of from about 3:97 to about 5:95. The ceramic consists essentially of a tetragonal crystal phase grain and the inner and outer surfaces have a dimensional tolerance of between ±0.0015 inches.

In an alternate embodiment of the present invention, the outer surface of the ceramic roller has been modified to comprise the cubic phase crystal grain.

In another alternate embodiment of the present invention, the outer surface of the ceramic roller has been modified to comprise the monoclinic phase crystal grain.

For a better understanding of the present invention, together with other and further objects, advantages and capabilities thereof, reference is made to the following detailed description and appended claims in connection with the preceding drawings and description of some aspects of the invention.

DETAILED DESCRIPTION OF THE PREFERRED EMBODIMENT

Figure 1:
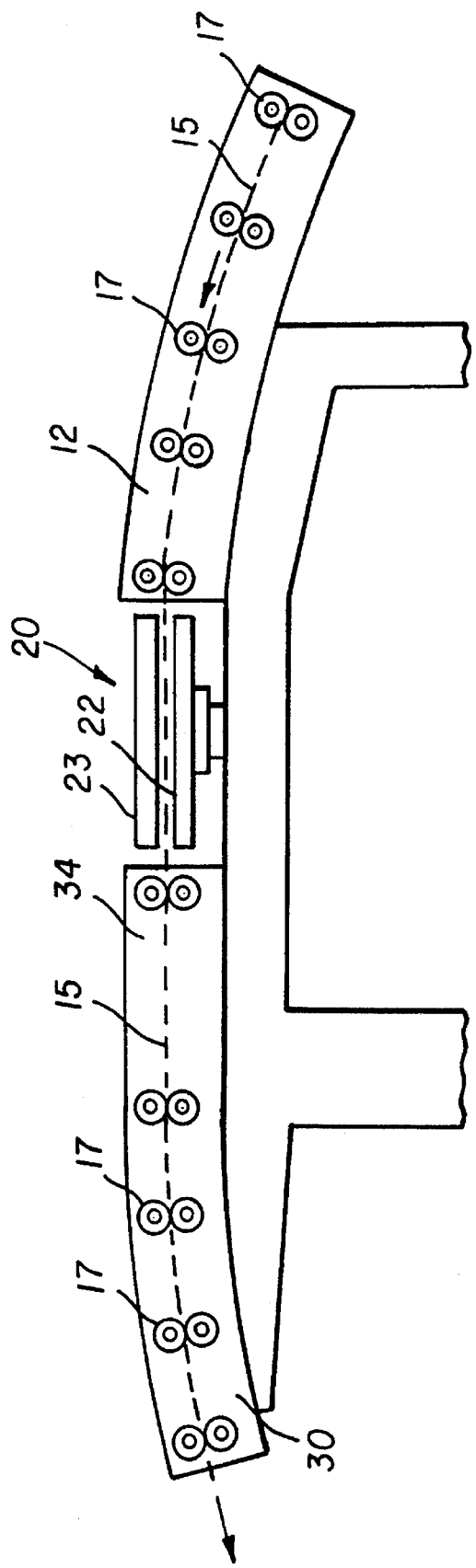
FIG. 1 is a schematic of a film conveyance arrangement in a film perforator.

Shown in FIG. 1 is the film conveyance arrangement in a film perforator. It includes a feed chute 12, wherein the film is propelled towards the perforator 20. The perforator includes a die top 22 and a stripper plate 23. After perforation, the film 15 is conveyed through a shuttle chute 30 which includes a shuttle gate 34. The stripper plate 23 strips the film or paper from the punch and the perforations are removed by gravity. As is shown in FIG. 1, a series of guide rollers 17 convey the film 15 through the feed chute, the perforator 20 and the shuttle chute 34. Presently, chrome plated stainless steel rollers are typically used as conveyance rollers. However, the chrome plated stainless steel rollers do not have good wear resistance. In addition, chrome plated stainless steel rollers are prone to corrosion. Loose debris from corrosion can contaminate the photographic films. Part of the reason for the corrosion is that it is not possible to chrome plate uniformly the narrow inner diameter hole of the roller. This results in a shortening of the service life of the conveyance roller. In addition, wear of the steel pin along with the inner diameter of the roller increases the runout of the rollers and, thus, affects transportation of the film. The present invention solves the above identified problems.

The present invention uses a novel ceramic material described in U.S. Pat. Nos. 5,336,282 and 5,290,332. A net-shape ceramic roller for photographic film perforating machines is produced as described below. The ceramic roller requires essentially no machining after manufacture. The dimensional tolerances of the rollers are critical in a perforating machine. The ceramic rollers of the present invention have a dimensional tolerance of ±0.0015 inches for the outer diameter and ±0.0015 inches for the inner diameter. The ceramic rollers of the present invention have a concentricity of ±0.0005 and a surface finish on the outer diameter of better than 4 microinch. Ceramic rollers of the present invention are manufactured more cost effectively than stainless steel rollers. The ceramic rollers of the present invention are manufactured from yttria alloyed tetragonal zirconia polycrystals (Y-TZP) which contain from 3 to 5 mole percent of yttria in high purity zirconium oxide. Other alloying compounds like ceria (CeO) or magnesia (MgO) can also be used to achieve similar properties. Materials like silicon carbide or composites like zirconia reinforced alumina, or silicon carbide reinforced alumina may also be used for this application.

Pure zirconia can exist in three different crystallographic states depending on the melting and sintering temperatures. The monoclinic phase is formed at the lowest temperature. As the temperature increases, the monoclinic phase first transforms to a metastable tetragonal and then to a cubic phase. The cubic and tetragonal phases can be stabilized at room temperature by alloying with yttria, calcia, ceria and magnesia.

The fabrication process of ceramic rollers of the present invention involves cold uniaxial pressing of 3 to 5 mole percent yttria-zirconia powders to a green shape and then sintering to yield net-shape rollers. By controlling several critical steps in the process, net-shape rollers were produced within ± 0.001 percent of the targeted shape. The following are the essential steps of this process:

1. The powder is well controlled to ensure repeatability of the process. The particle size and their distribution must be uniform and consistent. The agglomerate size is 30 to 60 µm, the average being 50 µm. The grain size is from 0.1 to 0.6 µm, the average being 0.3 µm. The distribution of grain size is as follows;
   10% less than 0.1 µm
   50% less than 0.3 µm
   90% less than 0.6 µm.

2. Purity of the material must be well controlled. The purity must be from 99.9 to 99.99 percent. The alloy content of the yttria is maintained between 3 and 5 mole percent, the preferred concentration is 3 mole percent. Polyvinyl alcohol is used as a binder, the concentration of which varies from 3 to 5 percent by volume. The preferred concentration of the binder is 4 percent. Surface area of the individual grain ranges from between 10 to 15 $m^2/g$ and the preferred value is 14 $m^2/g$.

Figure 3:
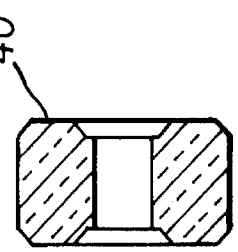
FIG. 3 is a sectional view of a conveyance roller.
Figure 2:
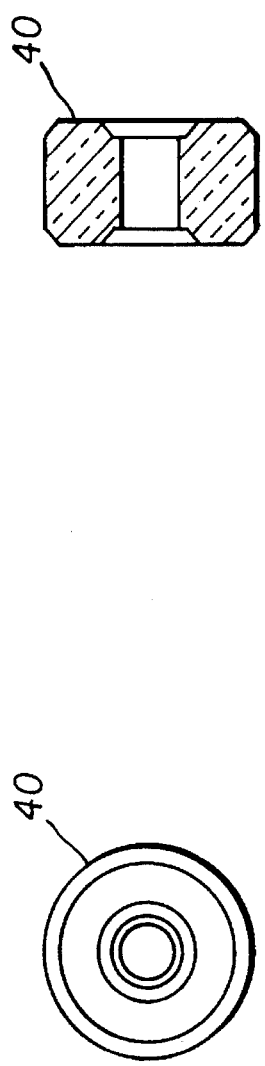
FIG. 2 is a side view of a conveyance roller.

3. Mold design. The mold used to manufacture the rollers of the present invention must be within ±0.0005 inches for the outer diameter and ±0.00025 inches for the inner diameter. Shown in FIGS. 2 and 3 is a roller 40 produced using the present invention. The mold involved must be capable of producing very precise green parts so that the final dimensional tolerances after sintering can be achieved.

4. Sintering schedule. The following is the sintering schedule which is required for the present invention:
   a. Heating the green part from room temperature to 300° C. at a rate of 0.3° C./min (presintering step).
   b. Heating the green part from 300° C. to 400° C. at a rate of 0.1° C./min.
   c. Heating the green part from 400° C. to 600° C. at a rate of 0.4° C./min.
   d. Heating the green part from 600° C. to 1500° C. at a rate of 1.5° C./min and holding the part at 1500° C. for 120 minutes for sintering.
   e. Cooling the sintered part from 1500° C. to 800° C. at a rate of 2° C./min.
   f. Cooling the sintered part from 800° C. to room temperature at a rate of 1.6° C./min.

Deviation from the above sintering schedule or other factors noted above will not produce the dimensional tolerances as discussed below.

Example 1

Zirconia powders were alloyed with up to 5 mole percent yttria, preferably 3 mole percent, and calcined to get single phase tetragonal structure. The alloyed zirconia powders were cold compacted using high precision molds to form green rollers. The compacting pressures were varied between 10 and 20 kpsi, preferably 15 kpsi. The green rollers were sintered at temperatures ranging from 1400 to 1600 degrees C for times between 1 and 3 hours, preferably at 1500 degrees C for 2 hours. During sintering, rollers were placed on flat plates such as alumina which could withstand the high temperature.

X-ray diffraction pattern analysis shows 100% tetragonal structure of the rollers produced from the above process. The hardness measured by Knoop indenters was in the range of 1000 to 1300 KHN. Deviation in dimensional tolerances were as follows. The outer diameter had a tolerance of ±0.0015 inches, the inner diameter had a dimensional tolerance of ±0.00025 inches and the length dimensional tolerance was ±0.001 inches. The ceramic rollers produced in the above process were placed in a perforator and tested along with conventional chrome plated stainless steel rollers. Not only did the ceramic rollers last 5 to 15 times longer than the stainless steel rollers but the steel pins did not show any wear or corrosion and the wear debris was less in the vicinity of the ceramic rollers. As a whole, the perforating machine ran uninterrupted 5 to 15 times longer producing better quality and cleaner films.

Example 2

Cubic outer surfaces were produced by placing the rollers completely buried in MgO powder and sintered at 1500° C. as described in Example 1. The outer diameter and inner diameter surfaces which are the critical wear surfaces were modified to the cubic structures. These rollers have not been tested in the machines but previous results suggest a longer service life than Y-TZP rollers.

Example 3

Monoclinic outer surfaces were produced by placing the rollers completely buried in very fine (approximately 0.3 micrometer) pure zirconia powder and sintered at 1500° C. as described in Example 1. Coupled angle X-ray diffraction indicated that the core was tetragonal phase. Glancing angle X-ray diffraction demonstrated a monoclinic phase case on the surface in contact with the zirconia powder.

While there has been shown and described what are present considered the preferred embodiments of the present invention, it will be obvious to those skilled in the art that various changes, alterations and modifications may be made therein without departing from the scope of the invention as defined by the appended claims.

What is claimed is:

1. A ceramic roller having an outer surface and an inner surface comprising a net-shape ceramic consisting essentially of zirconium oxide and yttria wherein the ceramic has a molar ratio of yttria to zirconium oxide of from about 3:97 to about 5:95 and wherein the ceramic consists essentially of the tetragonal crystal phase grain and wherein the outer surface has a dimensional tolerance of between +0.0015 and −0.0015 inches and the inner surface has a dimensional tolerance of between +0.00025 and −0.00025 inches.

2. The ceramic roller according to claim 1 wherein the roller has a concentricity of ±0.0005.

3. The ceramic roller according to claim 1 wherein the outer surface has a 4 microinch finish.

4. A ceramic roller having an outer surface and an inner surface comprising a net-shape ceramic consisting essentially of zirconium oxide and yttria wherein the ceramic has a molar ratio of yttria to zirconium oxide of from about 3:97 to about 5:95 and wherein the ceramic comprises a tetragonal phase crystal grain and the outer surface comprises a cubic phase crystal grain and wherein the outer surface has a dimensional tolerance of between +0.0015 and −0.0015 inches and the inner surface has a dimensional tolerance of between +0.00025 and −0.00025 inches.

5. The ceramic roller according to claim 4 wherein the roller has a concentricity of ±0.0005.

6. The ceramic roller according to claim 4 wherein the outer surface has a 4 microinch finish.

7. A ceramic roller having an outer surface and an inner surface comprising a net-shape ceramic consisting essentially of zirconium oxide and yttria wherein the ceramic has a molar ratio of yttria to zirconium oxide of from about 3:97 to about 5:95 and wherein the ceramic comprises a tetragonal phase crystal grain and the outer surface comprises a monoclinic phase crystal grain and wherein the outer surface has a dimensional tolerance of between +0.0015 and −0.0015 inches and the inner surface has a dimensional tolerance of between +0.00025 and −0.00025 inches.

8. The ceramic roller according to claim 7 wherein the roller has a concentricity of ±0.0005.

9. The ceramic roller according to claim 7 wherein the outer surface has a 4 microinch finish.

* * * * *